US012789916B2

(12) United States Patent
Harbison et al.

(10) Patent No.: US 12,789,916 B2
(45) Date of Patent: Nov. 10, 2026

(54) TRUCK BED DECK FLOORS WITH REINFORCING RIB PATTERNS AND TRUCKS INCLUDING DECK FLOORS WITH REINFORCING RIB PATTERNS

(71) Applicant: Toyota Motor Engineering & Manufacturing North America, Inc., Plano, TX (US)

(72) Inventors: Kelly L. Harbison, Canton, MI (US); Rajesh Chennagowni, Canton, MI (US); Herbert Meingast, Ann Arbor, MI (US); Ronald T. Rogers, Saline, MI (US); Wasim Ukra, Canton, MI (US); Robert Chi-Ong Tam, Ann Arbor, MI (US)

(73) Assignees: Toyota Motor Engineering & Manufacturing North America, Inc., Plano, TX (US); Toyota Jidosha Kabushiki Kaisha

( * ) Notice: Subject to any disclaimer, the term of this patent is extended or adjusted under 35 U.S.C. 154(b) by 750 days.

(21) Appl. No.: 17/887,969

(22) Filed: Aug. 15, 2022

(65) Prior Publication Data

US 2024/0051613 A1 Feb. 15, 2024

(51) Int. Cl.
*B62D 25/20* (2006.01)
*B62D 33/02* (2006.01)

(52) U.S. Cl.
CPC ......... *B62D 25/2054* (2013.01); *B62D 33/02* (2013.01)

(58) Field of Classification Search
CPC ................ B62D 25/2054; B62D 33/02; B62D 33/0273; B62D 21/09; B62D 25/20; B62D 25/2027; B62D 33/00; B62D 21/02
USPC ... 296/193.07, 30, 37.6, 901.1, 184.1, 182.1
See application file for complete search history.

(56) References Cited

U.S. PATENT DOCUMENTS

| | | | | |
|---|---|---|---|---|
| 3,481,643 A * | 12/1969 | Campbell | B62D 25/2054 | 52/798.1 |
| 4,518,196 A * | 5/1985 | Forster | B60H 1/00557 | 244/119 |
| 4,976,490 A * | 12/1990 | Gentle | B62D 29/004 | 296/183.1 |
| 5,088,616 A * | 2/1992 | Susko | B65F 1/16 | 220/908 |
| 6,092,862 A * | 7/2000 | Kuwahara | B62D 25/2054 | 296/184.1 |
| 6,128,815 A | 10/2000 | Jurica et al. | | |
| 6,733,067 B1 * | 5/2004 | Miskech | B62D 25/2054 | 296/183.1 |
| 6,799,792 B2 | 10/2004 | Jurica et al. | | |
| 6,902,228 B2 | 6/2005 | Kikuchi | | |

(Continued)

FOREIGN PATENT DOCUMENTS

| | | | |
|---|---|---|---|
| DE | 202022105996 U1 * | 11/2022 | B62D 33/02 |
| WO | WO-8600588 A * | 1/1986 | |

*Primary Examiner* — Patricia L Engle
(74) *Attorney, Agent, or Firm* — Dinsmore & Shohl LLP

(57) ABSTRACT

A truck includes a passenger cabin and a truck bed located rearward of the passenger cabin in a vehicle longitudinal direction. The truck bed includes a deck floor. The deck floor includes ridges that extend outward on an underside of the deck floor and extend lengthwise in a vehicle longitudinal direction. The deck floor further includes reinforcing ribs that extend outward from the ridges and along lengths of the ridges at the underside of the deck floor.

18 Claims, 5 Drawing Sheets

(56) References Cited

U.S. PATENT DOCUMENTS

| | | | | |
|---|---|---|---|---|
| 6,935,678 | B1 * | 8/2005 | Laban | B62D 33/02 296/183.1 |
| 7,152,911 | B1 * | 12/2006 | McNulty | B62D 65/02 296/184.1 |
| 7,575,264 | B1 * | 8/2009 | Solomon | B62D 25/2054 296/183.1 |
| 7,731,271 | B2 | 6/2010 | Shelbo et al. | |
| 10,150,516 | B2 * | 12/2018 | Courtright | B62D 25/2054 |
| 10,793,201 | B1 | 10/2020 | Johnston, VII | |
| 10,875,583 | B2 * | 12/2020 | Stojkovic | B62D 33/02 |
| 10,946,905 | B2 * | 3/2021 | Jansma | B62D 21/09 |
| 11,155,300 | B1 * | 10/2021 | Jansma | B62D 21/03 |
| 11,235,817 | B2 | 2/2022 | Higgins et al. | |
| 2002/0140245 | A1 * | 10/2002 | Coleman, II | B60R 5/04 296/26.09 |
| 2006/0055207 | A1 * | 3/2006 | Reinhardt | B62D 25/20 296/193.07 |
| 2006/0255612 | A1 * | 11/2006 | Montagna | B62D 25/2054 296/39.1 |
| 2011/0133517 | A1 * | 6/2011 | Leanza | B62D 27/02 296/203.01 |
| 2013/0043701 | A1 * | 2/2013 | Hagenbuch | B62D 25/2045 296/184.1 |
| 2015/0231990 | A1 * | 8/2015 | Hudson | B62D 25/2054 296/65.03 |
| 2017/0043729 | A1 * | 2/2017 | Courtright | B60R 13/01 |
| 2020/0223495 | A1 * | 7/2020 | Stibich | B62D 33/02 |
| 2021/0323607 | A1 * | 10/2021 | Jansma | B62D 25/2054 |
| 2021/0403096 | A1 * | 12/2021 | Higgins | B62D 29/043 |
| 2022/0105992 | A1 * | 4/2022 | Sugawara | B32B 27/32 |
| 2023/0126542 | A1 * | 4/2023 | Dean | B62D 25/2054 296/39.2 |
| 2024/0208577 | A1 * | 6/2024 | Itai | B62D 29/008 |

* cited by examiner

TRUCK BED DECK FLOORS WITH REINFORCING RIB PATTERNS AND TRUCKS INCLUDING DECK FLOORS WITH REINFORCING RIB PATTERNS

TECHNICAL FIELD

The present specification generally relates to trucks and, more specifically, to trucks with truck beds that include deck floors with reinforcing rib patterns.

BACKGROUND

Typical truck bed deck floors are formed of steel with cross members for structural support. Resin deck floors are also known, but can have reduced strength compared to metal deck floors, particularly in certain areas. As such, it is often the case that the resin deck floors are formed thick to provide added strength. Increased thickness adds to the weight of the deck floors.

What is needed are resin deck floors that have reduced thickness and increased strength for reduced weight on the truck.

SUMMARY

In accordance with one embodiment, a truck includes a passenger cabin and a truck bed located rearward of the passenger cabin in a vehicle longitudinal direction. The truck bed includes a deck floor. The deck floor includes ridges that extend outward on an underside of the deck floor and extend lengthwise in a vehicle longitudinal direction. The deck floor further includes reinforcing ribs that extend outward from the ridges and along lengths of the ridges at the underside of the deck floor.

In another embodiment, a resin truck bed inner structure includes a deck floor including ridges that extend outward on an underside of the deck floor and extend lengthwise in a vehicle longitudinal direction. The deck floor further includes reinforcing ribs that extend outward from the ridges and along lengths of the ridges at the underside of the deck floor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Trucks according to the present specification include a passenger cabin and a truck bed located rearward of the passenger cabin. The truck bed includes opposite sidewalls and a deck floor that extends between the sidewalls. The deck floor has ridges that extend outward on an underside of the deck floor also has corresponding recesses that extend inward from an exposed side of the deck floor and that extend lengthwise in the vehicle longitudinal direction. Reinforcing ribs are provided that extend outward from the ridges and along lengths of the ridges at the underside of the deck floor. In some embodiments, the reinforcing ribs intersect at a 4 or 5-way point of intersection.

Figure 1:
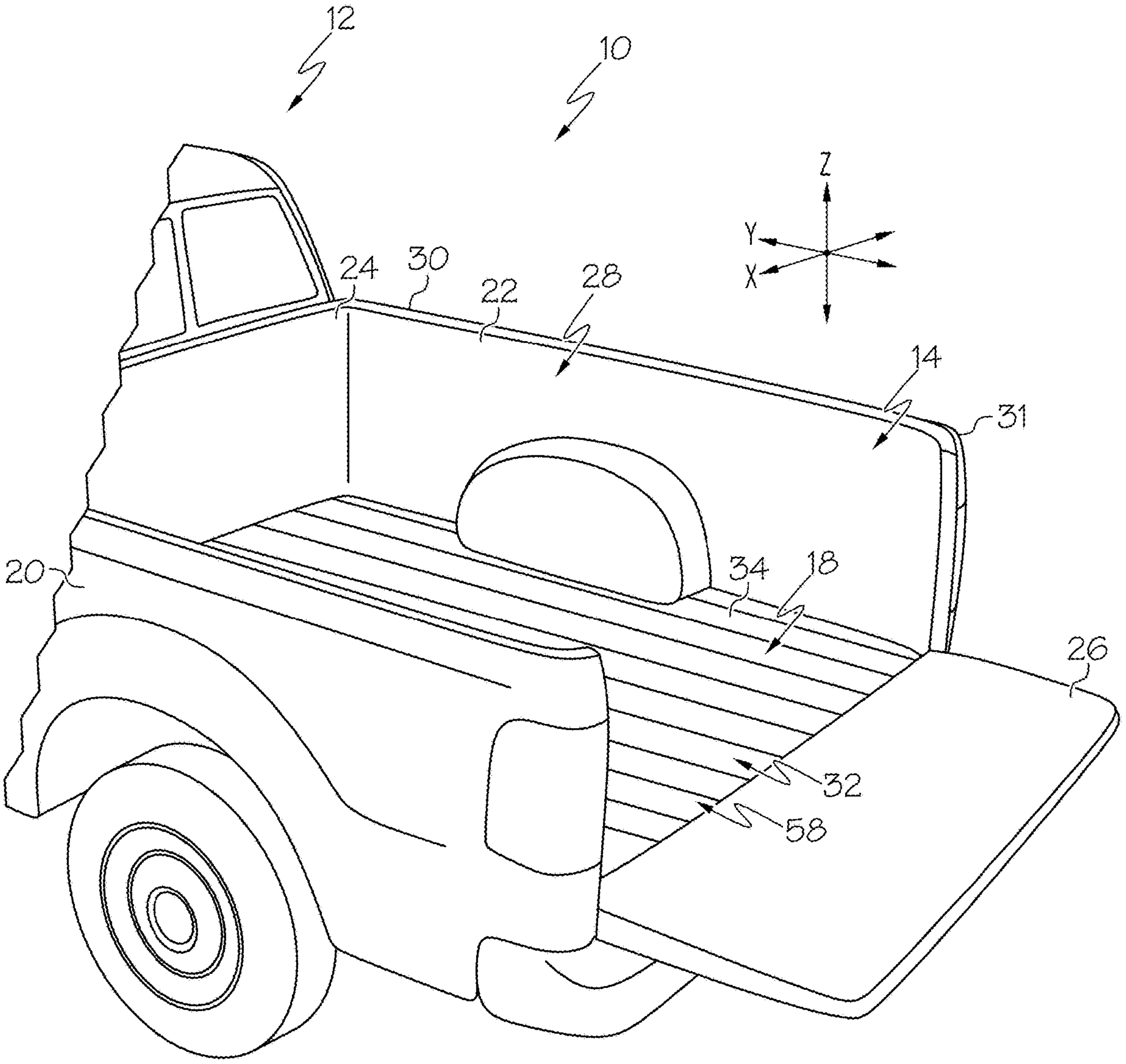
FIG. 1 depicts a side view of a truck having a truck bed including a deck floor, according to one or more embodiments shown and described herein.

As used herein, the term "vehicle longitudinal direction" refers to the forward-rearward direction of the pickup truck (i.e., in the +/−vehicle Y direction depicted in FIG. 1). The term "vehicle lateral direction" refers to the cross-pickup truck direction (i.e., in the +/−vehicle X direction depicted in FIG. 1), and is transverse to the vehicle longitudinal direction. The term "vehicle vertical direction" refers to the upward-downward direction of the pickup truck (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Figure 2:
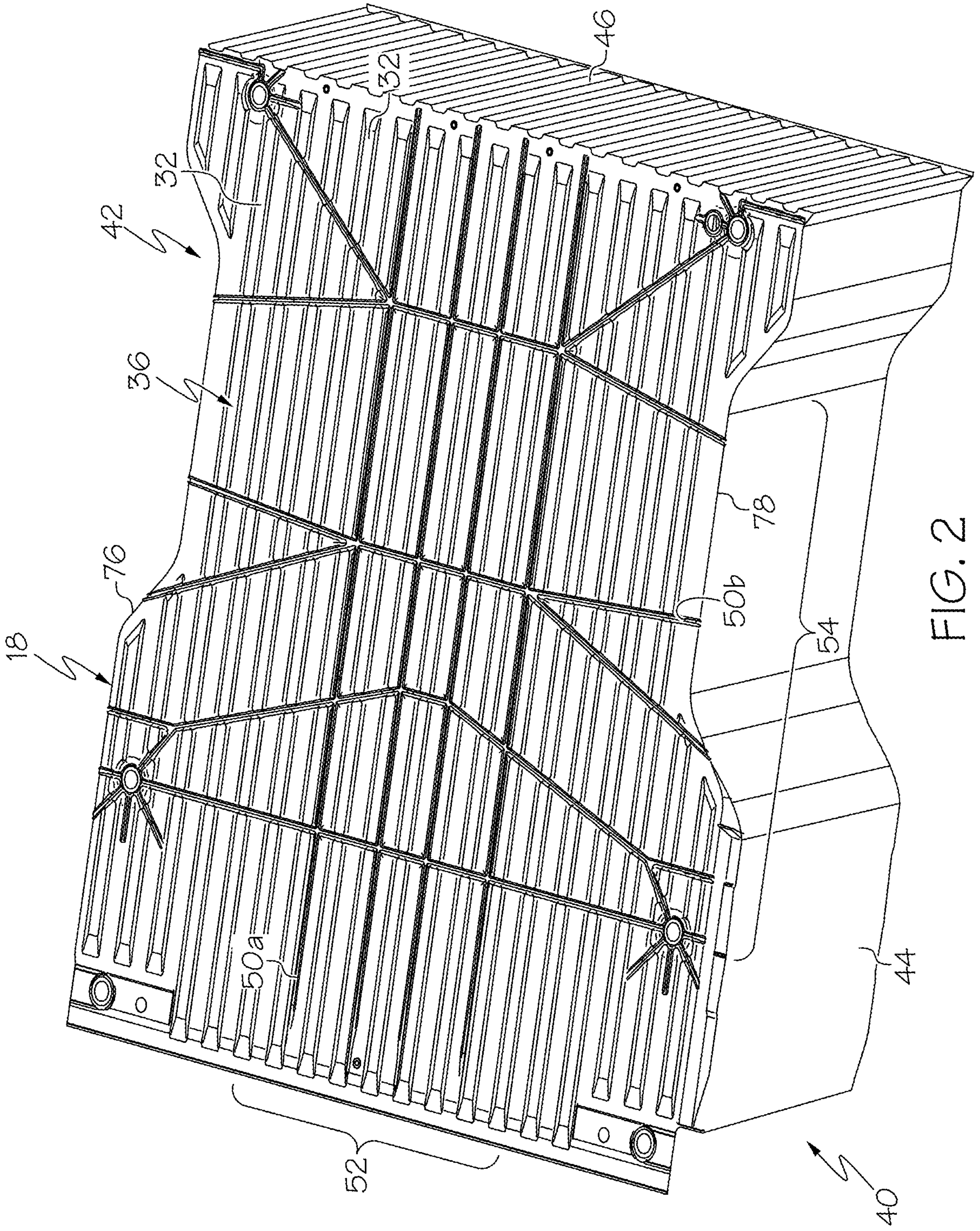
FIG. 2 depicts a perspective view of a truck bed inner structure for use with the truck of FIG. 1, according to one or more embodiments shown and described herein.

Referring to FIGS. 1 and 2, a pickup truck is generally illustrated at 10. The pickup truck 10 includes a passenger cabin 12 and a truck bed 14. The truck bed 14 includes a deck floor 18, a pair of spaced apart sidewalls 20, 22, a front wall 24, and a tailgate 26. The deck floor 18, the sidewalls 20, 22, the front wall 24, and the tailgate 26 define a storage area 28 of the truck bed 14.

The sidewalls 20, 22 extend parallel to the vehicle longitudinal direction. Each sidewall 20, 22 includes a front end 30 and an opposite rear end 31. The front wall 24 extends between the front ends 30 of the sidewalls 20, 22. The tailgate 26 extends between the rear ends 31 of the sidewalls 20, 22.

The tailgate 26 is pivotally connected to the sidewalls 20, 22 for movement between a closed position and an open position. In the closed position, the tailgate 26 extends parallel to the vehicle vertical direction. In the open position, the tailgate 26 extends parallel to the vehicle longitudinal direction as shown in FIG. 1.

The deck floor 18 may be formed of a plastic resin and may include ridges 32 that form an undulating pattern of peaks and valleys that extend inward from an upper, exposed side 34 and outward from a lower, underside 36 (FIG. 2) of the deck floor 18. The ridges 32 also extend in the vehicle longitudinal direction a majority of the length of the deck floor 18. The ridges 32 can provide added thickness and also strength for the deck floor 18 compared to a planar, flat structure.

Referring to FIG. 2, the deck floor 18 may be part of a molded truck bed inner structure 40 that includes the deck floor 18, sidewalls 42 and 44 and a front wall 46 that are all formed together as a single, monolithic part. The underside 36 of the deck floor 18 includes the ridges 32 that extend outward from the underside 36 and extend in the vehicle longitudinal direction over the length of the deck floor 18. The ridges 32 also extend parallel to one another forming an array of the ridges 32 along the underside 36 of the deck floor 18.

Referring also briefly to FIG. 1, the ridges 32 are formed as an undulating pattern of peaks and valleys with the ridges 32 extending outward at the underside 36 of the deck floor 18 providing corresponding recesses 58 on the exposed side 34 of the deck floor 18. Between the adjacent ridges 32 and recesses 58 are flat regions 61 that provide a planar base surface 62 at the exposed side 34 of the deck floor 18.

Depending, at least in part, on the configurations of the deck floors, how they are supported and the types of loads applied, there may be areas of the deck floors that are prone to experience higher stress concentrations. These areas of the deck floors that are prone to experience higher stress concentrations can be determined using computer modeling and testing of the deck floors under various load configurations and magnitudes. Without wishing to be bound by theory, the deck floors described herein include reinforcing ribs in addition to the ridges extending alongside the ridges on the underside of the deck floors to provide additional material thickness at certain areas, which can reduce the stress experienced by the deck floors in those areas when a load is applied. The reinforcing ribs may be molded with deck floors as solid protrusions that extend outward from the undersides of the deck floors thereby providing the additional material thicknesses at the predetermined deck floor locations.

Figure 3:
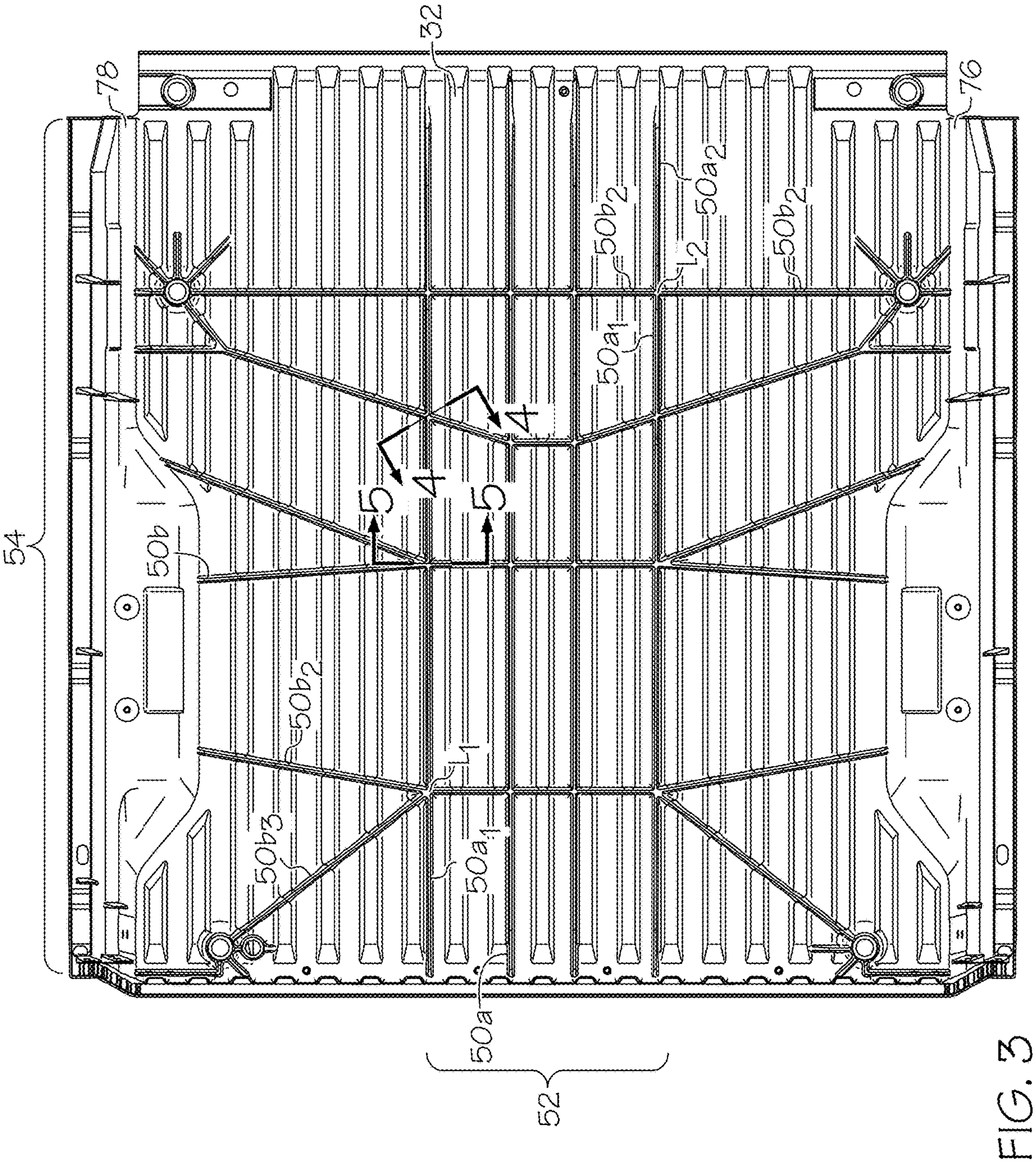
FIG. 3 depicts a planar view of the truck bed inner structure of FIG. 2, according to one or more embodiments shown and described herein.
Figure 4:
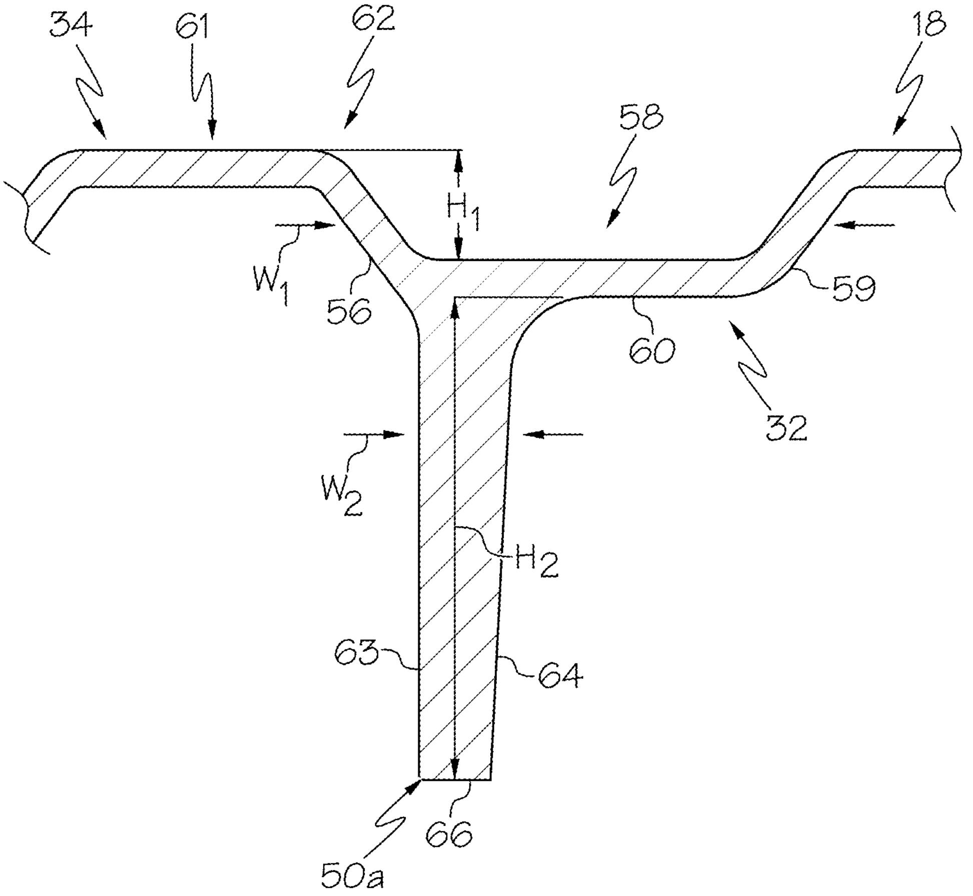
FIG. 4 illustrates a section view along line 4-4 of FIG. 3, according to one or more embodiments shown and described herein.

Referring again to FIG. 2 and also to FIG. 3, the deck floor 18 further includes the reinforcing ribs 50*a* and *b* that extend outward from the underside 36 of the deck floor 18. The reinforcing ribs 50*a* and *b* include a first set 52 of the reinforcing ribs 50*a* that extend in the vehicle longitudinal direction and a second set 54 of the ribs 50*b* that extend at least partially in the vehicle lateral direction. The first set 52 of reinforcing ribs 50*a* extend parallel to and alongside respective ridges 32. Referring for example to FIG. 4, one of the ridges 32 is illustrated that includes a first side 56, an opposite second side 59 and a flat bottom 60 that extends laterally between the first and second sides 56 and 59. In the illustrated example, the reinforcing rib 50*a* extends longitudinally along the bottom 60 of the ridge 32. The reinforcing rib 50*a* may be formed as an extension of the side 56 in that the side 56 of the ridge 32 curves into a side 63 of the reinforcing rib 50*a* and the reinforcing rib 50*a* is located nearer to the side 56 than the other side 59.

As can be seen, the ridge 32 has a maximum width $W_1$ measured between the sides 56 and 59 that is greater than a maximum width $W_2$ of the reinforcing rib 50*a* measured between sides 63 and 64. In some embodiments, the maximum width $W_2$ of the reinforcing rib 50*a* may be no greater than $0.75W_1$, such as no greater than $0.5W_1$, such as no greater than $0.4W_1$, such as no greater than $0.3W_1$, such as no greater than $0.2W_1$. The ridge 32 has a maximum height $H_1$ measured between the bottom 60 and the exposed side 34 of the deck floor 18 that is less than a maximum height $H_2$ of the reinforcing rib 50*a* measured between the bottom 60 of the ridge 32 and a terminal edge 66 of the reinforcing rib 50*a*. In some embodiments, the maximum height $H_2$ of the reinforcing rib 50*a* may be at least about equal to $W_1$, such as at least about $1.5W_1$, such as at least about $2W_1$, such as at least about $2.5W_1$, such as at least about $3W_1$. The ridge 32 and reinforcing rib 50*a* may be formed together, such as by molding, 3D printing, etc. using a reinforced plastic material for example.

Figure 5:
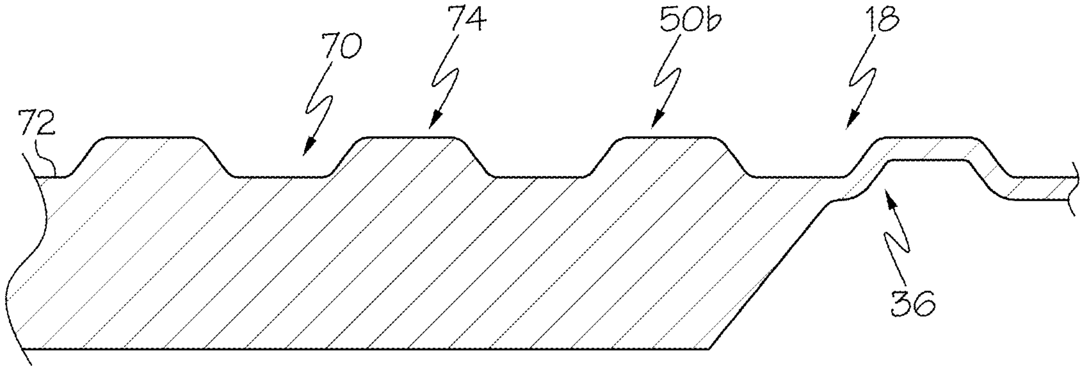
FIG. 5 illustrates another section view along line 5-5 of FIG. 3, according to one or more embodiments shown and described herein.

Referring to FIG. 5, a section view of one of the laterally-extending reinforcing ribs 50*b* is illustrated that extends outward from the underside 36 of the deck floor 18. The reinforcing rib 50*b* extends laterally across multiple ones of the longitudinally extending ridges 32, so the reinforcing rib 50*b* includes recesses 70 extending along a top edge 72 of the reinforcing rib 50*b* that form part of the ridges 32 and extensions 74, also extending along the top edge 72 that intersect the underside 36 of the deck floor 18 between adjacent ridges 32.

Referring again to FIG. 3, the reinforcing ribs 50*a* and 50*b* may intersect at intersecting locations. For example, $L_1$ shows an intersecting location where five reinforcing ribs 50*a*1, 50*a*2, 50*b*1, 50*b*2 and 50*b*3 intersect. Another intersecting location $L_2$ shows where four reinforcing ribs 50*a*1, 50*a*2, 50*b*1 and 50*b*2 intersect. The intersecting locations L may be placed at areas where relatively high concentrations of stress is expected as the reinforcing ribs 50*a* and *b* can provide increases in cross-sectional area in those locations. In some embodiments, the reinforcing ribs 50*b* that extend in the vehicle lateral direction intersect side edges 76 and 78 of the deck floor 18. In this regard, the reinforcing ribs 50*b* may extend substantially the entire width of the deck floor 18, which can also provide reduced stress.

Figure 6:
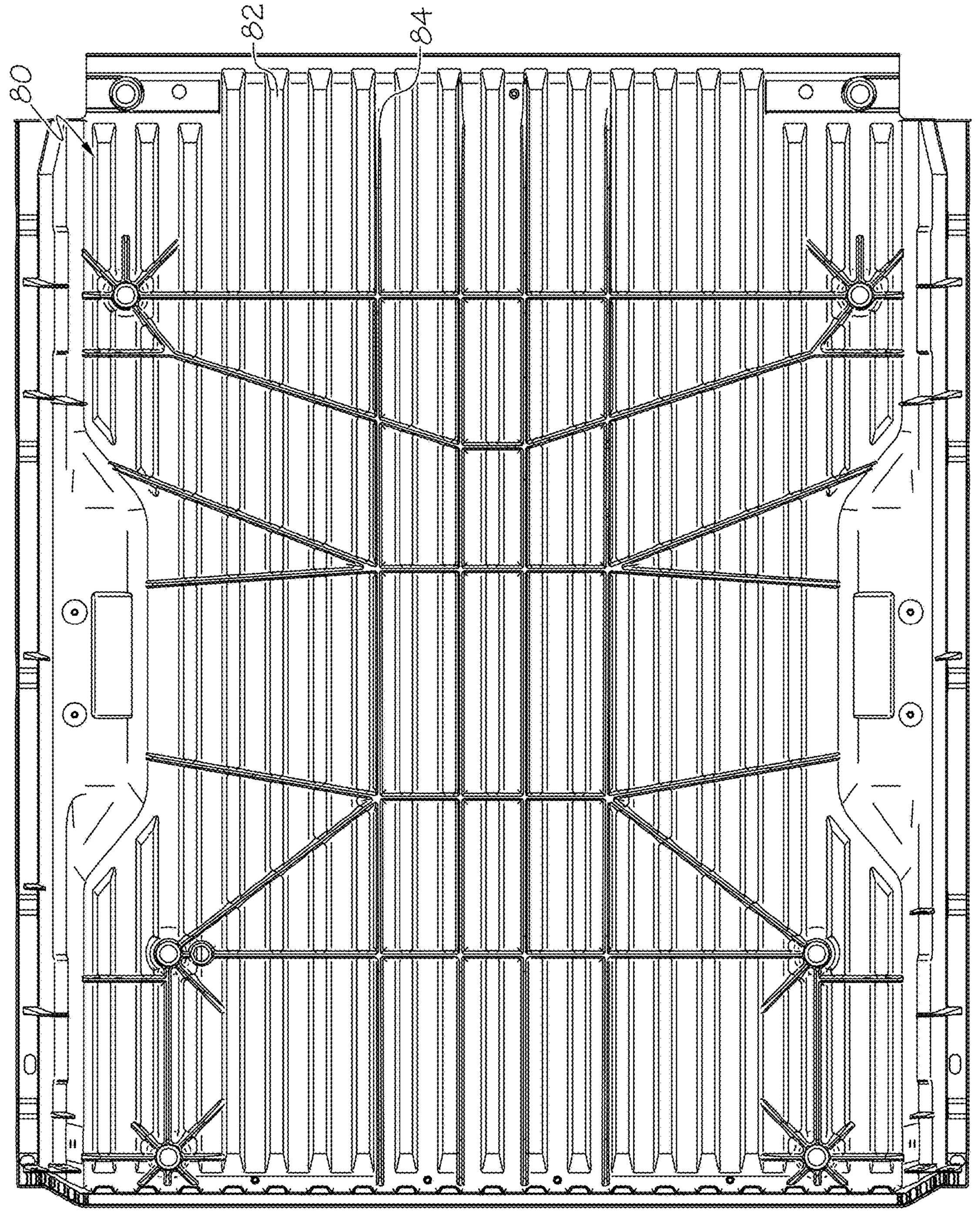
FIG. 6 depicts another embodiment of a truck bed inner structure, according to one or more embodiments shown and described herein.

Reinforcing ribs along with ridges may be used for deck floors of different sizes. The embodiment of FIGS. 2 and 3 illustrate a deck floor length of about five feet. Referring to FIG. 6, a deck floor 80 has a deck floor length of about six feet and also includes both ridges 82 and reinforcing ribs 84. Any suitable rib pattern may be used depending on the deck floor size and the support structure used for the deck floors.

The above-described deck floors takes advantage of the benefits of resin deck floor structures including reduced mass and part count, but still allows the deck floors to meet strength and stress requirements of different deck lengths. The deck floors also can also have reduced overall deck material volume while having taller deck heights and wider frame spans that still provide the predetermined strength results.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck comprising:

a passenger cabin; and a truck bed located rearward of the passenger cabin in a vehicle longitudinal direction, the truck bed includes a deck floor;

wherein the deck floor comprises ridges that extend outward on the deck floor and extend lengthwise in a vehicle longitudinal direction;

a first set of longitudinally-extending reinforcing ribs that extend outward from the ridges and along lengths of the ridges at the underside of the deck floor; and a second set of laterally-extending reinforcing ribs that extend along the underside of the deck floor, wherein the laterally-extending ribs extend continuously across multiple ridges and form portions of the ridges along the deck floor with an undulating pattern of valleys and extensions formed by the laterally-extending ribs.

2. The truck of claim 1, wherein the longitudinally-extending and laterally-extending reinforcing ribs are formed as a monolithic part of the ridges.

3. The truck of claim 1, wherein the ridges are formed of undulating peaks and valleys, the longitudinally-extending reinforcing ribs being solid in cross-section along an entire height of the reinforcing ribs.

4. The truck of claim 3, wherein a maximum width of the longitudinally-extending reinforcing ribs is no more than half of a maximum width of the respective ridges from which each longitudinally-extending reinforcing rib extends outward from.

5. The truck of claim 3, wherein a maximum height of the longitudinally-extending reinforcing ribs is no less than twice a maximum height of the respective ridges from which each reinforcing rib extends outward from.

6. The truck of claim 1, wherein the longitudinally-extending reinforcing ribs each extend outward beyond a bottom of the respective ridges.

7. The truck of claim 1, wherein four or more longitudinally-extending and laterally-extending reinforcing ribs meet at an intersecting location.

8. The truck of claim 1, wherein at least some of the laterally-extending reinforcing ribs form multiple ridges.

9. The truck of claim 8, wherein the at least some of the laterally-extending reinforcing ribs intersect a side edge of the deck floor.

10. A resin truck bed inner structure, comprising:

a deck floor comprising ridges that extend outward on the deck floor and extend lengthwise in a vehicle longitudinal direction;

a first set of longitudinally-extending reinforcing ribs that extend outward from the ridges and along lengths of the ridges at the underside of the deck floor; and a second set of laterally-extending reinforcing ribs that extend along the underside of the deck floor, wherein the laterally-extending ribs extending continuously across multiple ridges forming portions of the ridges along the deck floor with an undulating pattern of valleys and extensions formed by the laterally-extending ribs.

11. The truck bed inner structure of claim 10, wherein the longitudinally-extending and laterally-extending reinforcing ribs are formed as a monolithic part of the ridges.

12. The truck bed inner structure of claim 10, wherein the ridges are formed of undulating peaks and valleys, the longitudinally-extending reinforcing ribs being solid in cross-section along an entire height of the reinforcing ribs.

13. The truck bed inner structure of claim 12, wherein a maximum width of the longitudinally-extending reinforcing ribs is no more than half of a maximum width of the respective ridges from which each longitudinally-extending reinforcing rib extends outward from.

14. The truck bed inner structure of claim 12, wherein a maximum height of the longitudinally-extending reinforcing ribs is no less than twice a maximum height of the respective ridges from which each longitudinally-extending reinforcing rib extends outward from.

15. The truck bed inner structure of claim 10, wherein the longitudinally-extending reinforcing ribs each extend outward beyond a bottom of the respective ridges.

16. The truck bed inner structure of claim 10, wherein four or more longitudinally-extending and laterally-extending reinforcing ribs meet at an intersecting location.

17. The truck bed inner structure of claim 10, wherein at least some of the laterally-extending reinforcing ribs form multiple ridges.

18. The truck bed inner structure of claim 17, wherein the at least some of the laterally-extending reinforcing ribs intersect a side edge of the deck floor.

* * * * *